(12) United States Patent
Flores et al.

(10) Patent No.: US 10,353,712 B2
(45) Date of Patent: Jul. 16, 2019

(54) UTILIZING SIGNATURES TO DISCOVER AND MANAGE DERELICT ASSETS OF AN INFORMATION TECHNOLOGY ENVIRONMENT

(71) Applicant: International Business Machines Corporation, Armonk, NY (US)

(72) Inventors: Romelia H. Flores, Keller, TX (US); Joseph E. Hackett, Flower Mound, TX (US); Leonard S. Hand, Red Creek, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1273 days.

(21) Appl. No.: 13/887,609

(22) Filed: May 6, 2013

(65) Prior Publication Data

US 2013/0246782 A1    Sep. 19, 2013

Related U.S. Application Data

(63) Continuation of application No. 13/112,197, filed on May 20, 2011, now Pat. No. 8,527,628.

(51) Int. Cl.
G06F 9/44 (2018.01)
G06F 9/4401 (2018.01)
(Continued)

(52) U.S. Cl.
CPC .......... *G06F 9/4401* (2013.01); *G06F 9/5061* (2013.01); *H04L 63/1416* (2013.01); *H04L 63/1433* (2013.01)

(58) Field of Classification Search
CPC ..................................................... G06F 9/4401
(Continued)

(56) References Cited

U.S. PATENT DOCUMENTS 6,731,411 B1    5/2004   Walforst
7,606,739 B1   10/2009   Johnson
(Continued)

OTHER PUBLICATIONS

Togashi, A.; "Proposal of Ubiquitous Agricultural Service for Rural Farm Revitalization"; INSPEC/IEEE; 2010.
(Continued)

*Primary Examiner* — Andrew C Georgandellis
(74) *Attorney, Agent, or Firm* — Cuenot, Forsythe & Kim, LLC

(57) ABSTRACT

A set of asset signatures can be analyzed. Each asset signature can be associated with an asset. Derelict assets can be discovered based on the asset signatures. The asset can represent a fundamental structural unit of an information technology (IT) environment. A multi-stage screening process can be performed to discover derelict assets. In a first stage, assets having a normal state are able to be changed to a suspect state based on results of analyzing the corresponding asset signature. In a second stage, assets having a suspect state are able to be selectively changed in state to a normal state or to a derelict state. An asset management system record can be maintained for each of the set of assets. Each record of the asset management system can be a configuration item (CI), which indicates whether each of the set of assets is in a normal state, a suspect state, or a derelict state. The asset management system can periodically reclaim resources consumed by derelict assets.

15 Claims, 5 Drawing Sheets

(51) Int. Cl.
*G06F 9/50* (2006.01)
*H04L 29/06* (2006.01)

(58) Field of Classification Search
USPC .......................................... 709/224
See application file for complete search history.

(56) References Cited

U.S. PATENT DOCUMENTS

| | | | | |
|---|---|---|---|---|
| 2004/0215985 | A1* | 10/2004 | Armstrong | G06F 1/3203 |
| | | | | 713/300 |
| 2005/0013258 | A1* | 1/2005 | Fike | H04L 49/557 |
| | | | | 370/252 |
| 2008/0046576 | A1* | 2/2008 | Wahl | H04L 61/1517 |
| | | | | 709/228 |
| 2008/0140978 | A1* | 6/2008 | Fulmer | G06F 11/3612 |
| | | | | 711/170 |
| 2012/0151036 | A1* | 6/2012 | Detro | H04L 41/0853 |
| | | | | 709/224 |

OTHER PUBLICATIONS

Symantec; "IT Risk Management Report—Trends Through Dec. 2006"; GOOGLE; Feb. 2007.
Curatola, AP.; "Impairment of Long-Lived Assets"; GOOGLE; Mar. 1996.

* cited by examiner

```
<!DOCTYPE signature[                                                          310
        <!ELEMENT id (#PCDATA)>
        <!ELEMENT name (#PCDATA)>
        <!ELEMENT CIDescription (#PCDATA)>
        <!ELEMENT status (normal,suspect,derelict_delete,derelict_contain,retired)>
        <!ELEMENT evaluationStatus (normal,suspect,derelict_delete,derelict_contain,retired)>
        <!ELEMENT signatureType (VPNPortForward,server,DNS..)>
        <!ELEMENT isTemplate (true,false)>
        <!ELEMENT contact (#PCDATA)>
        <!ELEMENT owner (#PCDATA)>
        <!ELEMENT signaturePoints (#PCDATA)>
        <!ELEMENT pointThreshold (#PCDATA)>
        <!ELEMENT resetCounter (#PCDATA)>
        <!ELEMENT stateChangeDate (#PCDATA)>
        <!ELEMENT ActivationDate (#PCDATA)>
        <!ELEMENT signatureEvaluationFormula (formulaType)>
        <!ELEMENT signatureStatusFormula (formulaType)>
        <!ELEMENT trigger (triggerType*)>
]>

<!DOCTYPE triggerType[                                                        320
        <!ELEMENT id (#PCDATA)>
        <!ELEMENT name (#PCDATA)>
        <!ELEMENT triggerPoints (#PCDATA)>
        <!ELEMENT triggerEvaluationFormula (formulaType)>
        <!ELEMENT resetCounter (#PCDATA)>
        <!ELEMENT updateDate (#PCDATA)>
        <!ELEMENT dataCollector[(dataCollectorType*)>
]>

<!DOCTYPE dataCollectorType[                                                  330
        <!ELEMENT id (#PCDATA)>
        <!ELEMENT dataCollected (#PCDATA)>
        <!ELEMENT dataCollector (#PCDATA)>
        <!ELEMENT parameters (#PCDATA?)>
]>

<!DOCTYPE formulaType[                                                        340
        <!ELEMENT formulaElement (formulaElementType*)>
]>

<!DOCTYPE formulaElementType[
        <!ELEMENT seq (#PCDATA)>
        <!ELEMENT formula (#PCDATA)>
        <!ELEMENT return (#PCDATA)>
]>
```

FIG. 3

```
<signatureEvaluationFormula>                                                    410
        <formulaElement>
                <seq>1</seq>
                <formula>(trigger[T0001].triggerPoints == derelict) && (status == suspect) && (trigger[T0003])</formula>
                <return>derelict</return>
        </formulaElement>
        <formulaElement>
                <seq>2</seq>
                <formula>(trigger[T0002].triggerPoints == derelict) && (status == suspect) &&
(trigger[T0002])</formula>
                <return>derelict </return>
        </formulaElement>
        <formulaElement>
                <seq>3</seq>
                <formula>(trigger[T0001].triggerPoints == derelict)</formula>
                <return>suspect</return>
        </formulaElement>
        <formulaElement>
                <seq>4</seq>
                <formula>(trigger[T0002].triggerPoints == derelict)</formula>
                <return>suspect</return>
        </formulaElement>
        <formulaElement>
                <seq>5</seq>
                <formula>(true)</formula>
                <return>normal</return>
        </formulaElement>
</signatureEvaluationFormula>
```

```
<signatureStatusFormula>                                                        420
        <formulaElement>
                <seq>1</seq>
                <formula>(status == suspect) && (evalutionStatus == derelict) && (trigger[T0004])</formula>
                <return>derelict</return>
        </formulaElement>
        <formulaElement>
                <seq>2</seq>
                <formula>(status == normal) && (evaluationStatus == derelict) && (trigger[T0004])</formula>
                <return>suspect</return>
        </formulaElement>
        <formulaElement>
                <seq>3</seq>
                <formula>(status == normal) && (evaluationStatus == suspect) && (trigger[T0004])</formula>
                <return>suspect</return>
        </formulaElement>
        <formulaElement>
                <seq>4</seq>
                <formula>(status == suspect) && (evaluationStatus == normal) && (trigger[T0004])</formula>
                <return>normal</return>
        </formulaElement>
        <formulaElement>
                <seq>5</seq>
                <formula>(true)</formula>
                <return>normal</return>
        </formulaElement>
</signatureStatusFormula>
```

FIG. 4

```
<trigger>                                                                                    510
        <id>T0001</id>
        <name>9.1.1.1 ITR_Available</name>
        <triggerPoints>0</triggerPoints>
        <triggerEvaluationFormula>
                <formulaElement>
                        <seq>1</seq>
                        <formula>(dataCollector[dc001] == derelict_delete) || dataCollector[dc001] ==
retired) || dataCollector[dc001] == derelict_contain)</formula>
                        <return>derelict</return>
                </formulaElement>
                <formulaElement>
                        <seq>2</seq>
                        <formula>(dataCollector[dc001] == suspect)</formula>
                        <return>suspect </return>
                </formulaElement>
                <formulaElement>
                        <seq>3</seq>
                        <formula>(true)</formula>
                        <return>0</return>
                </formulaElement>
        </triggerEvaluationFormula>
        <resetCounter>0</resetCounter>
        <updateDate>07152010</updateDate>
        <dataCollector>                                                          520
                <id>dc001</id>
                <dataCollected>normal</dataCollected>
                <dataCollector>ITR_Signature</dataCollector>
                <parameters>srv9111,status</parameters>
        </dataCollector>
</trigger>
```

FIG. 5

UTILIZING SIGNATURES TO DISCOVER AND MANAGE DERELICT ASSETS OF AN INFORMATION TECHNOLOGY ENVIRONMENT

BACKGROUND

The present invention relates to the field of change management and, more particularly, to utilizing asset signatures to detect and manage derelict items within an asset management system.

One of the biggest challenges facing change configuration management within large and small data centers is to identify and subsequently relinquish unused assets. Traditionally, when assets (e.g., server, platform, software) are automatically provisioned, additional assets associated with security, data, and enablement can be provisioned during this process. Many of these additional assets cannot be tracked and/or linked to the primarily provisioned assets. The challenge is further compounded when a data center expands by adding new assets. While feedback mechanisms exist to manage provisioned assets, the additional assets can go unmanaged. Consequently, server sprawl and other less than optimal situations can result as the additional assets continue to go unused.

When it is necessary to relinquish the provisioned asset, the asset can either be retired or reused. However, all additional assets can typically continue to use resources (e.g., memory, disk space, processor load etc.) in the data center. Security risks can occur as a result of the existence of these assets. For example, when a "pinhole" is utilized within a firewall to permit access to the asset, the pinhole can remain after the asset is retired. While conventional systems excel at discovering assets and even tracking assets throughout the asset lifecycle, these systems cannot manage additional assets which typically have relationships to the provisioned assets that are generalized, obscure, and/or undefined via their tooling. That is, conventional change management systems fall short when these relationships deal with infrastructure modifications.

BRIEF SUMMARY

One embodiment of the disclosure is for a method, computer program product, system, and/or apparatus for determining derelict assets. In the embodiment, a set of asset signatures can be analyzed. Each asset signature can be associated with an asset. Derelict assets can be discovered based on the asset signatures. The asset can represent a fundamental structural unit of an information technology (IT) environment. A multi-stage screening process can be performed to discover derelict assets. In a first stage, assets having a normal state are able to be changed to a suspect state based on results of analyzing the corresponding asset signature. In a second stage, assets having a suspect state are able to be selectively changed in state to a normal state or to a derelict state. An asset management system record can be maintained for each of the set of assets. Each record of the asset management system can be a configuration item (CI), which indicates whether each of the set of assets is in a normal state, a suspect state, or a derelict state. The asset management system can periodically reclaim resources consumed by derelict assets.

One embodiment of the disclosure can be for a system comprising a derelict engine within a change management system capable of handling a configuration item state utilizing an asset signature associated with the configuration item. The asset signature can be associated with an asset. The asset signature can be a superset of data elements, wherein the data elements comprise of a descriptive element, a state element, a support element, and a data gathering element. The system can also include a data store able to store the asset signature associated with the configuration item. The data store can be communicatively linked to the derelict engine.

Another embodiment of the disclosure can include an asset management system that includes a set of asset signatures stored in a storage medium. Each asset signature can include a signature evaluation formula and a signature status formula. The signature status formula can perform a point in time evaluation of the corresponding asset. The signature status formula can perform an evaluation of the corresponding asset over a time range. Asset state can be determined when analyzing the set of asset signatures by combining results of both the signature evaluation formula and the signature status formula.

BRIEF DESCRIPTION OF THE SEVERAL VIEWS OF THE DRAWINGS

FIG. 3 is a schematic diagram illustrating sample document type definitions (DTD) for an asset signature in accordance with an embodiment of the inventive arrangements disclosed herein.

FIG. 4 shows pseudo code for a signature evaluation formula and a signature status formula in accordance with an embodiment of the inventive arrangements disclosed herein.

FIG. 5 shows pseudo code for a trigger in accordance with an embodiment of the inventive arrangements disclosed herein.

DETAILED DESCRIPTION

Figure 1:
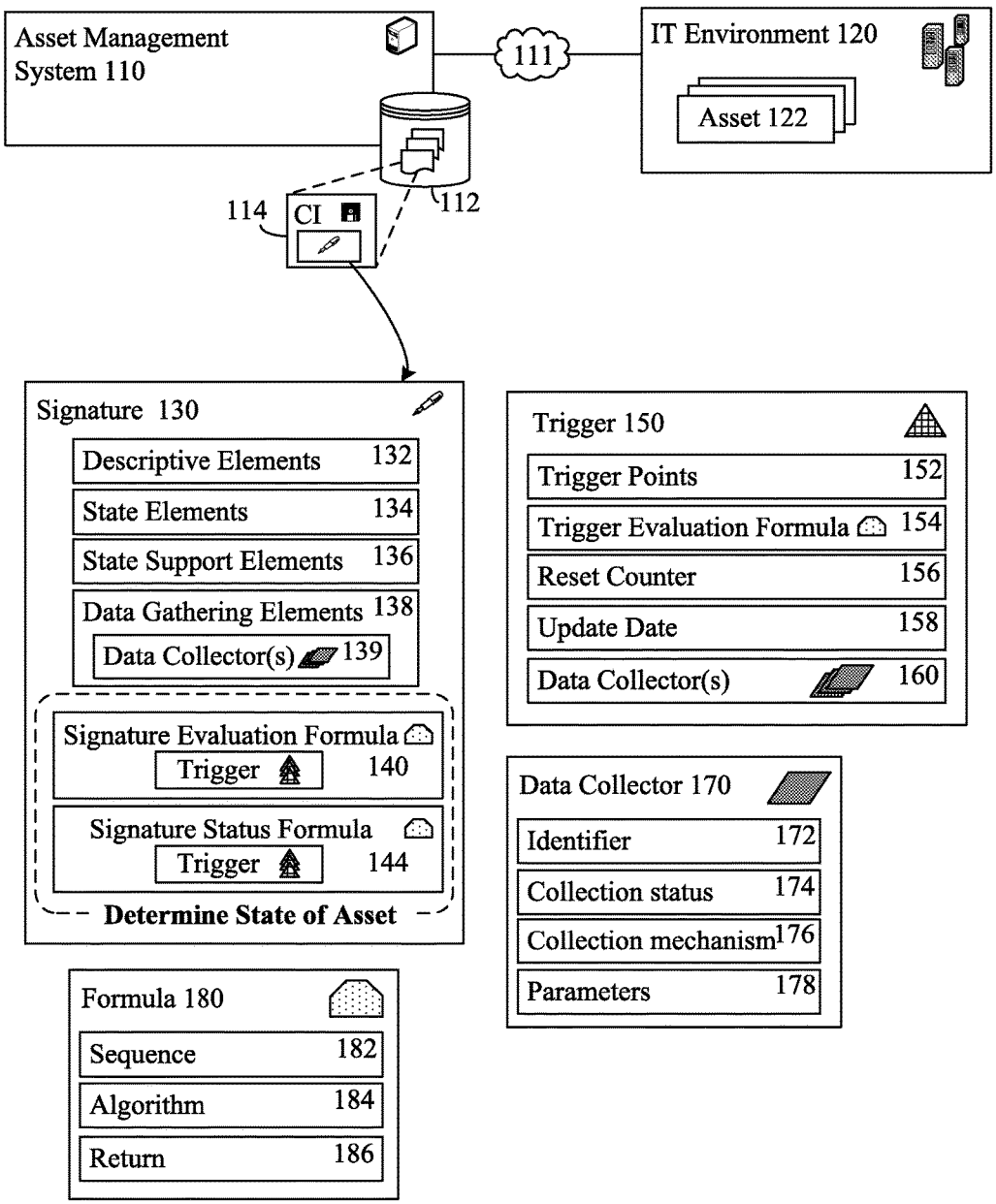
FIG. 1 is a schematic diagram illustrating a system for asset signatures which are able to discover and manage derelict assets of an IT environment in accordance with an embodiment of the inventive arrangements disclosed herein.

Many information technology (IT) environments exist (e.g., data centers), where relatively dynamic changes (e.g., additions, changes, deletions) of IT assets are expected. The number of dynamic changes is continuously increasing, as more cloud based solutions, which include remotely hosted solutions, are becoming more common. A significant number of IT assets are provisioned in an IT environment, which are not tracked by an asset management system. The present solution concerns discovering provisioned assets (or configuration items corresponding to these assets) that would not have been discovered by traditional approaches so that these provisioned assets (referred to as derelict assets) through their own means. The disclosed solution also provides feedback to traditional asset management systems to improve the accuracy of maintained configuration item (CI) relationships. Towards this end, the disclosure recognizes that an asset state can have multiple dimensions that include: 1) the asset has elements that are relevant at a point in time, it has elements that need to occur over time, it has elements that must evolve over time.

An embodiment of the present solution establishes a set of sophisticated asset signatures with an ability to be easily customized with ongoing detection of signature updates. The asset signatures can be analyzed to discover "derelict signatures" which indicates a statistically significant probability that the corresponding asset is a derelict asset. In one embodiment, a multi-phased approach can be taken, where suspect assets can be initially identified so that a more detailed discovery and analysis can be performed on this subset of assets. This type of multi-phased "screening" can ensure implementation of the asset signatures and related functionality can occur with minimal impact on runtime performance and minimal consumption of computing resource of the IT environment.

As disclosed herein, each asset signature can include state elements supporting multiple states, data gathering elements, and a set of one or more formulas, each having customizable threshold triggers. The formulas can, for example, include a signature evaluation formal and a signature status formula, each with their own set of one or more triggers. The signature evaluation formula and the signature status formula can work together to enhance and detect a derelict signature. These formulas can be asset-specific, so that different types of assets and different specific assets provisioned in an IT environment can have its own customized formula.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 for asset signatures which are able to discover and manage derelict assets of an IT environment 120 in accordance with an embodiment of the inventive arrangements disclosed herein. As shown herein, an asset management system 110 can manage a set of assets 122 of an IT environment 120. Assets 120 can have corresponding configuration items 114, which are stored in data store 112. Each configuration item 114 can include an asset signature 130 (i.e., configuration items 114 can be indexed to a unique asset signature 130).

Each asset signature 130 can include one or more formulas (i.e. having a structure as shown by formula 180), such as signature evaluation formula 140 and signature statue formula 144. Each of these formulas 140, 144 can be associated with one or more customizable triggers 150. Triggers can include their own formulas 154 (i.e. having a structure as shown by formula 180). Signatures 130 and triggers 150 can also have one or more data collectors 139, 160 (i.e. having a structure as shown by data collector 170). The asset signatures 130 are sophisticated and tailored objects having an ability to be easily customized with ongoing detection functions and capable of being easily updated as situations of use change.

As used herein, the IT environment 120 includes hardware and/or software components that functionally interact with each other. The IT environment 120 can one or more discrete machine (computers, servers, peripherals, storage devices), which execute software and firmware. In one environment, the IT environment 120 can include all equipment and software of a data center. Additionally, a distributed data center consisting of two or more linked data centers, which are together managed by the asset management system 110 can be considered an IT environment, as defined herein.

An asset 122 can represent a fundamental structural unit of the IT environment. An asset 122 can correspond to a single configuration item 144 of the asset management system 110. In one embodiment, assets 122 can be defined in a nested fashion, so that multiple lower-level assets can be used to form an asset having a higher level of granularity. Assets 122 can include software only assets, hardware only assets, and hybrid assets including both software and hardware. Further, assets 120 can represent executable sets of computer program instructions, configuration parameters, ports, rules (e.g., a virtual network or VPN rule on an appliances), etc. Assets 122 can be created in the IT environment 120, can be released, contained, or destroyed. Assets can have a state 122 within IT environment 120, which dynamically changes over time.

The asset management system 110 can be a system that manages, tracks, monitors, provisions, releases, etc. assets 122 of IT environment 210. That is, asset management system 110 can perform IT asset management (ITAM) for IT environment 120. The asset management system 110 can be referred to as an asset lifecycle management system, a configuration management system, a change management system, etc. Asset management system 110 can handle asset 122 from acquisition (or creation) through disposal. Asset management system 110 can establish configuration items (CI) 114 for each asset 122, which are maintained in a data store 112. A state of the configuration item 114 should mirror a state of the corresponding asset 122, where an asset's state (and thus the state of the CI 114) can dynamically change over time.

The asset signature 130 (or just signature 130 for short) of a configuration item is a superset of all data and/or formula elements used to identity an asset 122 (or configuration item 114) as normal, suspect derelict, or being actually derelict. The signature 130 can include descriptive elements 132, state elements 134, state support elements 136, data gathering elements 138, and/or formulas 140, 142.

The descriptive elements 132 refer to items that identity an asset 122 (or configuration item 114). Descriptive elements 132 can include, for example, a unique asset identifier, an asset name, an asset description, an asset type, an asset owner, an asset administrator, an activation date, a template associated with the asset, and the like.

The state elements 134 can include elements that contain the state of the corresponding asset 122, where state can refer to a status as well as an evaluation state. States that an asset can be in, which are recorded by the state asset elements 134 can include normal, suspect, derelict delete, derelict contain, and retired. A normal state can indicate that the asset being leveraged in the IT environment (e.g., a data center) can be operating "normally". The suspect state can indicate that the asset is suspect as a potential derelict asset. For example, a screening phase for assets can indicate that a significant probability (e.g., a configurable threshold) exists that the asset is derelict. Suspect assets can undergo further analysis, which can determine that the asset is either "normal" is actually a derelict asset. The derelict delete state can be for assets that have been determined as derelict, where the asset is to be deleted. The derelict contain state is for assets determined as derelict, were some doubt exists about the certainty of deletion. Thus, a mechanism for recovery is provided before the asset is deleted (a derelict contain asset can be recovered, where a derelict delete asset cannot). The retired state indicates that an asset is to be relinquished or retired.

State support elements 136 include a set of items of information that help derive the state (of state elements 134). State support elements 136 can include, for example, signature points, point threshold, reset counter, state change date, signature evaluation formula 140, and signature status formula 144.

The data gathering elements 138 provide information in support of the formulas 140, 144. The data gathering elements 138 can gather information from one or more identifiable sources, such as Uniform Resource Identifier (URI) addressable sources accessible via an internet. The data gathering element can include zero or more data collectors 139.

The signature evaluation formula 140 can be a point in time evaluation of the asset 122. The signature status formula 144 can be a time aspect for the signature. Formula 140 and 144 together can determine a current status for the asset 122.

A trigger 150 can be associated with the signature evaluation formula 140 and/or the signature status formula 144. The trigger 150 can represent a way of "scoring" a signature 130 by initiating a gathering of relevant data to support the formulas 140, 144. A trigger 150 may operate independent of other triggers 150 or a trigger 150 may rely on data combine from one or more other triggers 150 (i.e., dependency relationships can exist among triggers 150). Each trigger 150 can have one or more trigger point 152, a trigger evaluation formula 154, a reset counter 156, an update date 158, and/or one or more data collectors 160.

Each trigger point 152 can be used to keep track of a "value" that the trigger is evaluated to. That is, a formula 180 that is associated with a trigger 150 can include one or more unknown values, where each value can correspond to a trigger point 152.

The trigger evaluation formula 154 can be an algorithm or procedure that executes for a given trigger point 152 to produce a value. This value can result from information collected by one or more data collectors 160 being combined in accordance with an established mathematical equation.

The reset counter 156 can be used to keep track of administrative resets to the trigger points 152. There can be numerous occasions where an administrator will want to reset the formulas based on changes to the IT environment 120 or to a corresponding configuration item (CI) 114. Administrative resets to the trigger points 152 can be automatic based on an occurrence of a set of defined conditions and/or can be manually invoked by an authorized administrator.

The update date 158 element can be used to keep track of the "freshness" of the trigger state. That is, the update date can reflect a date of currency for trigger 150. Some triggers 150 can be configured to execute the trigger evaluation formula 154 every so often, which can be determined by using the update date 158 (or other time counter).

Each data collector 160 of a trigger 150 can be an element that collects data in support of the trigger evaluation formula 154. The data collector can reference a database record or any addressable data item (which can include local or remote information sources).

Generally, a data collector 170 can represent a programmatic object that is able to collect data from various sources, such as asset management system 110 and/or one or more asset discovery systems. Each data collector 170 can include an identifier 172, a collection status 174, a collection mechanism 176, and/or other parameters 178.

The identifier 172 can be a unique value (e.g., a number) associated with the data collector 170.

The collection status 174 can represent the status of the collected data. For example, the data collection status 174 can indicate whether a most recent data collection attempt was successful, was a failure, or partially successful.

The collection mechanism 176 is a specific mechanism used to collect information. For example, collection mechanism 176 can include a Structured Query Language (SQL) call, a remote invocation of a program or Web service, a URI, and the like.

Parameters 178 can represent configurable values used by the data collector 170.

Each formula 180 can be an expression, programmatic algorithm, mathematical formula, and the like used within a signature 130 or trigger 150 to calculate a value. Formulas 180 help score a state of an asset 122 to determine whether that asset is derelict or not. Each formula can include a sequence 182, an algorithm 184, and a return 186.

The sequence 182 can be a number associated with the formula 180. The formula 180 can be evaluated in sequence until a value of TRUE is reached. Once reached, the formula 180 can stop future evaluations. The sequence 182 can be utilized for dependency relationships and when implementing processing time restrictions/conditions on the formula 180.

The algorithm 184 can be a mathematical equation, computational function, set of executable instructions which is run to assist in determining a state of the signature 114 or corresponding asset 122.

The return 186 is a value returned responsive to executing the algorithm 184. For example, for the signature evaluation formula 140 or the signature status formula 144, the return can be a state of normal, suspect, derelict delete, derelict contain, or retired.

Figure 2:
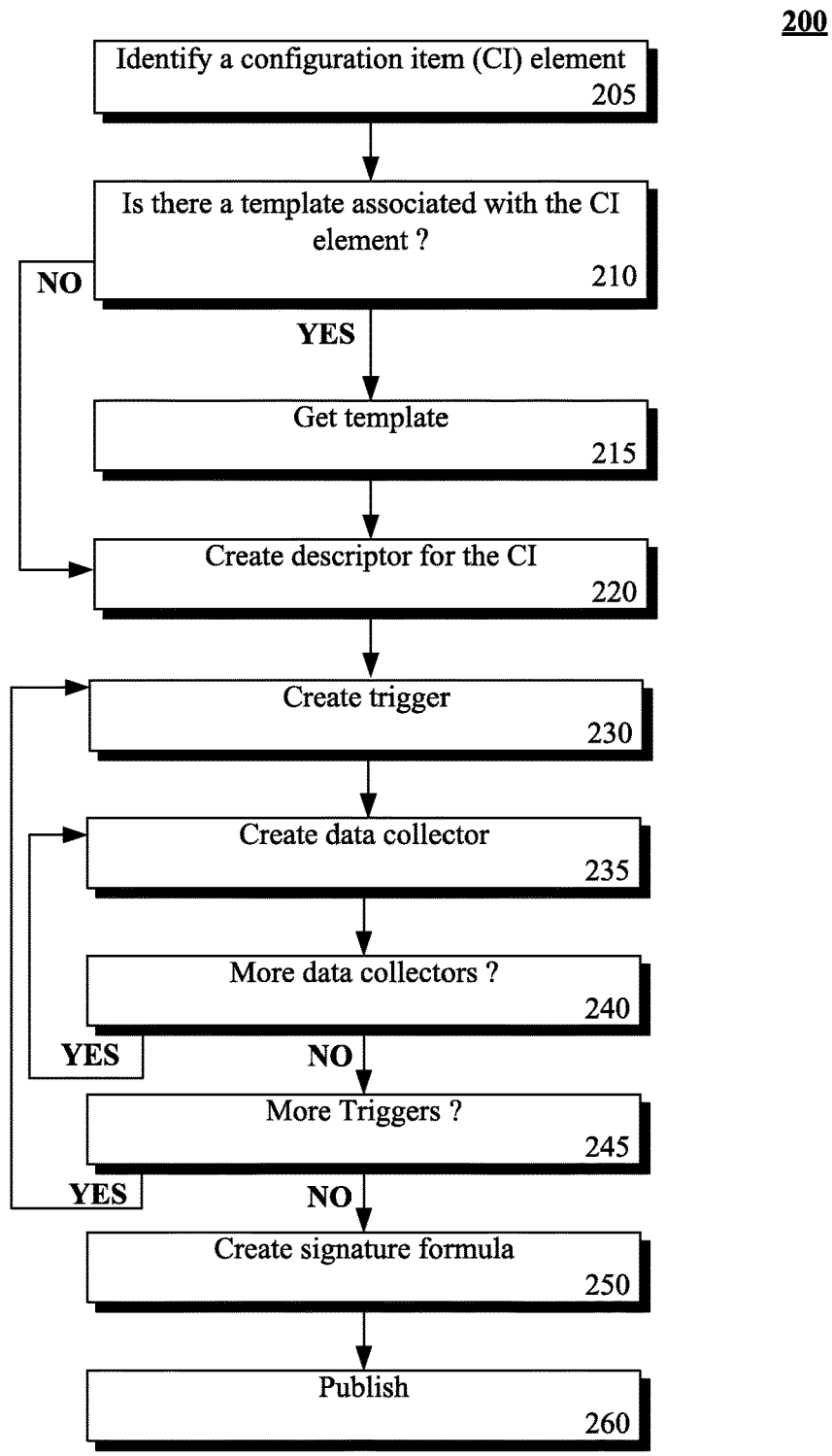
FIG. 2 shows a flowchart of a method for determining an asset's status using the asset signature in accordance with an embodiment of the inventive arrangements disclosed herein.

FIG. 2 shows a flowchart of a method 200 for determining an asset's status using the asset signature in accordance with an embodiment of the inventive arrangements disclosed herein. The method 200 can execute in context of system 100.

Method 200 can begin in step 205, where a configuration item (CI) that corresponds to an asset of an IT environment can be identified. This CI can be one, which initially lacks an asset signature, which is added during processing of method 200. Specifically, different types or categories of CIs can each have a characteristic template, which is used to generate an initial asset signature for the CI, which can be further modified/configured as necessary.

In step 210, a check can be made to determine whether a template associated with the CI exists. If so, that template can be retrieved in step 215, which can be used to populate initial or default values of the asset signature, which can be thereafter be modified. If no template exists (or if method 200 executes in an environment where templates are not used to construct asset signatures). Then the method can progress from step 210 directly to step 220.

In step 220, a descriptor (e.g., descriptive elements) for the asset signature can be created. In step 225, a formula (e.g., a signature evaluation formula or a signature status formula) can be created. In step 230, a trigger for the formula can be created. In step 232, trigger points, a trigger evaluation formula, and the like can be established for the trigger. In step 235, a data collector for the trigger can be created. If more data collectors are to be included for the asset signature, then the method can progress from step 240 to step 235, where additional triggers can be created. In step 245, if more triggers are to be crated for the formula, the method can progress from step 245 to step 230. If more formulas for the signature are to be established, the method can progress from step 250 to step 225. Once all formulas are established, the asset signature can be published, as shown by step 260. After the asset signature is established and published, it can be used to continuously update state information on the corresponding asset, as shown by step 265.

FIG. 3 is a schematic diagram illustrating sample document type definitions (DTD) for an asset signature in accordance with an embodiment of the inventive arrangements disclosed herein. That is, one contemplated embodiments, structural elements shown in FIG. 1 can be defined in an XML DTD.

In XML DTD 310, formula and data elements can be specified for a dynamic signature. DTD 310 can include, but is not limited to, descriptive elements, state elements, state support elements, data gathering elements, and the like. Descriptive elements can include, but is not limited to, an identifier, a name, a description contact, an owner, an activation date, and the like. State elements can include, but is not limited to, status, evaluation status, and the like. State support elements can include, but is not limited to signature value, threshold value, counter value, state change timestamp, and the like. Data gathering elements can include, but is not limited to, data sets, data sources, and the like.

In XML DTD 320, a trigger declaration can be established. Trigger can include, but is not limited to, a trigger value, a trigger formula, a state timestamp, a data collector, and the like. Trigger value can include, but is not limited to, a numeric value, an alphanumeric value, and the like. Trigger formula can include, but is not limited to, a programmatic expression, a mathematical formula, and the like. State timestamp can include, but is not limited to, a date value, a time value, and the like.

In XML DTD 330, a data collector element can be delineated. Data collector can include, but is not limited to, an identifier, a data set, a data collector mechanism, a data collector parameter, and the like. Identifier can be a unique value associated with each data collector element. Data set can be one or more portions of data collected by the data collector mechanism. Data collector mechanism can be a Structured Query Language (SQL) query, Remote Procedure Call (RPC), Remote Method Invocation (RMI), and the like. Parameter can include, user established parameters, system established parameters, and the like.

In XML DTD 340, a formula element can be described. Formula element can include, but is not limited to, a sequence number, a formula, a return value, and the like. Sequence number can be a unique value associated with a formula element. Formula can include, but is not limited to, a programmatic expression, a mathematical formula, and the like. Return value can be a status value including, but not limited to, normal, derelict contain, derelict delete, suspect, retired, and the like.

FIG. 4 and FIG. 5 shows pseudo code 410, 420, 510 for a signature evaluation formula, a signature status forma, and a trigger.

As can be seen from pseudo code 410 and 420, a signature evaluation and status formula can take various actions depending on an asset state, where states can include derelict, suspect, and normal as previously detailed.

Outcome of the evaluation and status formulas depends on specifics of triggers. Pseudo code 510 for a sample trigger (T0001) is shown by FIG. 5. As noted in FIG. 1, the trigger can include a data collector, which is shown by code 520.

Nothing in FIG. 4 and FIG. 5 (pseudo code 410, 420, 510, 520) is to be construed in a manner that limits the scope of the disclosure. This simplistic example is provided to assist with clarifying the concepts presented herein to one of ordinary skilled in the art. Derivatives to the pseudo code 410, 420, 510, 520 are contemplated and expected in the ordinary course of utilizing the inventive arrangements disclosed herein.

The flowchart and block diagrams in the FIGS. 1-5 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be handled substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method, comprising:
generating, for a particular asset, an asset signature including a signature evaluation formula and a signature status formula;
evaluating, using the asset signature and a multi-stage screening process, the asset to determine an asset state of the asset;
reclaiming, based upon a determination that the asset state is derelict, resources in an information technology (IT) environment consumed by the asset, wherein
the asset represents a fundamental structural unit of the IT environment,
the signature status formula is configured to perform an evaluation of the asset over a time range,
the signature evaluation formula is configured to perform a point-in-time evaluation of the asset.

2. The method of claim 1, wherein
the asset state is determined using both the signature status formula and the signature evaluation formula.

3. The method of claim 1, wherein
a first stage of the multi-stage screening process includes selectively changing the asset state from normal to suspect, and
a second stage of the multi-stage screening processing includes selectively changing the set state from normal to derelict.

4. The method of claim 1, wherein
each of the signature evaluation formula and the signature status formula include a respective trigger.

5. The method of claim 4, wherein
each of the triggers include a trigger point, a trigger evaluation formula, a reset counter, an update date, and a data collector.

6. An asset management system, comprising:
a computer hardware system including a hardware processor configured to initiate the following executable operations:
generating, for a particular asset, an asset signature including a signature evaluation formula and a signature status formula;
evaluating, using the asset signature and a multi-stage screening process, the asset to determine an asset state of the asset;
reclaiming, based upon a determination that the asset state is derelict, resources in an information technology (IT) environment consumed by the asset, wherein
the asset represents a fundamental structural unit of the IT environment,
the signature status formula is configured to perform an evaluation of the asset over a time range,
the signature evaluation formula is configured to perform a point-in-time evaluation of the asset.

7. The system of claim 6, wherein
the asset state is determined using both the signature status formula and the signature evaluation formula.

8. The system of claim 6, wherein
a first stage of the multi-stage screening process includes selectively changing the asset state from normal to suspect, and
a second stage of the multi-stage screening processing includes selectively changing the set state from normal to derelict.

9. The system of claim 6, wherein
each of the signature evaluation formula and the signature status formula include a respective trigger.

10. The system of claim 9, wherein
each of the triggers include a trigger point, a trigger evaluation formula, a reset counter, an update date, and a data collector.

11. A computer program product, comprising
a computer storage hardware device having computer usable program code embodied therewith,
the computer usable program code, which when executed by a computer hardware system, causes the computer hardware system to perform:
generating, for a particular asset, an asset signature including a signature evaluation formula and a signature status formula;
evaluating, using the asset signature and a multi-stage screening process, the asset to determine an asset state of the asset;
reclaiming, based upon a determination that the asset state is derelict, resources in an information technology (IT) environment consumed by the asset, wherein the asset represents a fundamental structural unit of the IT environment, the signature status formula is configured to perform an evaluation of the asset over a time range, the signature evaluation formula is configured to perform a point-in-time evaluation of the asset.

12. The computer program product of claim 11, wherein the asset state is determined using both the signature status formula and the signature evaluation formula.

13. The computer program product of claim 11, wherein a first stage of the multi-stage screening process includes selectively changing the asset state from normal to suspect, and a second stage of the multi-stage screening processing includes selectively changing the set state from normal to derelict.

14. The computer program product of claim 11, wherein each of the signature evaluation formula and the signature status formula include a respective trigger.

15. The computer program product of claim 14, wherein each of the triggers include a trigger point, a trigger evaluation formula, a reset counter, an update date, and a data collector.

\* \* \* \* \*